June 8, 1937. W. J. MILLER Re. 20,401

METHOD AND MEANS FOR FEEDING AND FORMING PLASTIC MATERIAL IN THE MANUFACTURE OF POTTERY

Original Filed Jan. 5, 1927 2 Sheets-Sheet 1

INVENTOR
William J. Miller
BY
K. G. Doub
ATTORNEY

June 8, 1937. W. J. MILLER Re. 20,401

METHOD AND MEANS FOR FEEDING AND FORMING PLASTIC MATERIAL IN THE MANUFACTURE OF POTTERY

Original Filed Jan. 5, 1927 2 Sheets-Sheet 2

INVENTOR
William J. Miller

BY K. G. Doub,
ATTORNEY

Reissued June 8, 1937 Re. 20,401

UNITED STATES PATENT OFFICE 20,401

METHOD AND MEANS FOR FEEDING AND FORMING PLASTIC MATERIAL IN THE MANUFACTURE OF POTTERY

William J. Miller, Swissvale, Pa.

Original No. 1,769,528, dated July 1, 1930, Serial No. 159,153, January 5, 1927. Application for reissue July 18, 1935, Serial No. 32,753

32 Claims. (Cl. 25—22)

This invention relates to an improved method and means for automatically feeding and forming plastic material in the manufacture of pottery.

The present application discloses subject matter also disclosed in my copending applications Serial Nos. 153,086 and 156,674, filed, respectively Dec. 7, 1926 and Dec. 23, 1926, which have matured into Patents No. 1,703,316 and No. 1,739,981.

According to the manual system of ware fabrication on a potter's wheel, the batter out pinches off gobs of plastic clay at random, from a slug, flattens the same into the form of a "pancake" of a diameter insuring complete coverage of the ware forming surface of a mold when applied thereto, and then deposits the same on a mold, the clay sticking thereto due to its adhesive nature, after which the potter jiggers the clay and sets the mold aside for subsequent transportation by a mold runner to the stove room. Air entrapment between the pancake and mold often occurs, preventing the establishment of a complete and perfect state of capillarity over the engaging surfaces of clay and mold so necessary to promote proper drying. The clay normally adheres to the mold, but often creeps or slips under the drag of the profile tool due to insufficient bonding.

By the recent improved method and means I am enabled to automatically extrude predetermined charges of elastic material directly into or on the molds and preliminarily preform the charges, sever or segregate the charges, preform the charges, and finally form or profile and trim or jigger the charges, in timed relation with means for automatically conveying the molds to and removing them from the said means.

The present method, in more general terms consists in covering a portion of the ware forming surface of a mold with clay in an amount, at least sufficient to form a ware body, then spreading the clay over the ware forming surface by pressing, as with a die to flow the clay towards the periphery of the mold, preferably in all directions simultaneously to completely cover the total area of the ware forming surface and adhesively bond the clay to the mold surface and then smoothing the surface of the clay as by jiggering with a profile tool. The radial progressive spreading action of the clay from the central zone of the mold toward the periphery prevents air entrapment common to manual bat application and at the same time, the clay is adhesively bonded to the mold by the pressure required to spread, setting up a bond of greater efficiency and one not liable to allow slippage of the clay on the mold and one that will maintain the bond unimpaired when under the profile tool, thus preventing destruction of the perfect state of capillarity established.

Means are also provided in the present instance for rotating and raising and lowering any one or all of the chucks independently or as a unit, to similarly raise and lower and rotate the molds carrying the charges, in timed relation to the extruding, segregating, preforming and jiggering means, while the charge is being subjected to either one or all of the foregoing operations.

The simplified form of feeder mechanism of the present application may be used with an automatic jigger such as is shown in my copending applications Serial Nos. 143,994 and 148,872, respectively filed Oct. 25, 1926, and Nov. 17, 1926, which have matured into Patents Nos. 1,750,762 and 1,757,132 and wherein means are also shown for automatically imparting a step-by-step movement to the mold carrier or conveyor. However, any suitable type of jigger as well as conveyor may be used, or these operations may be performed manually, the present invention being in nowise limited in this respect.

Figure 1:
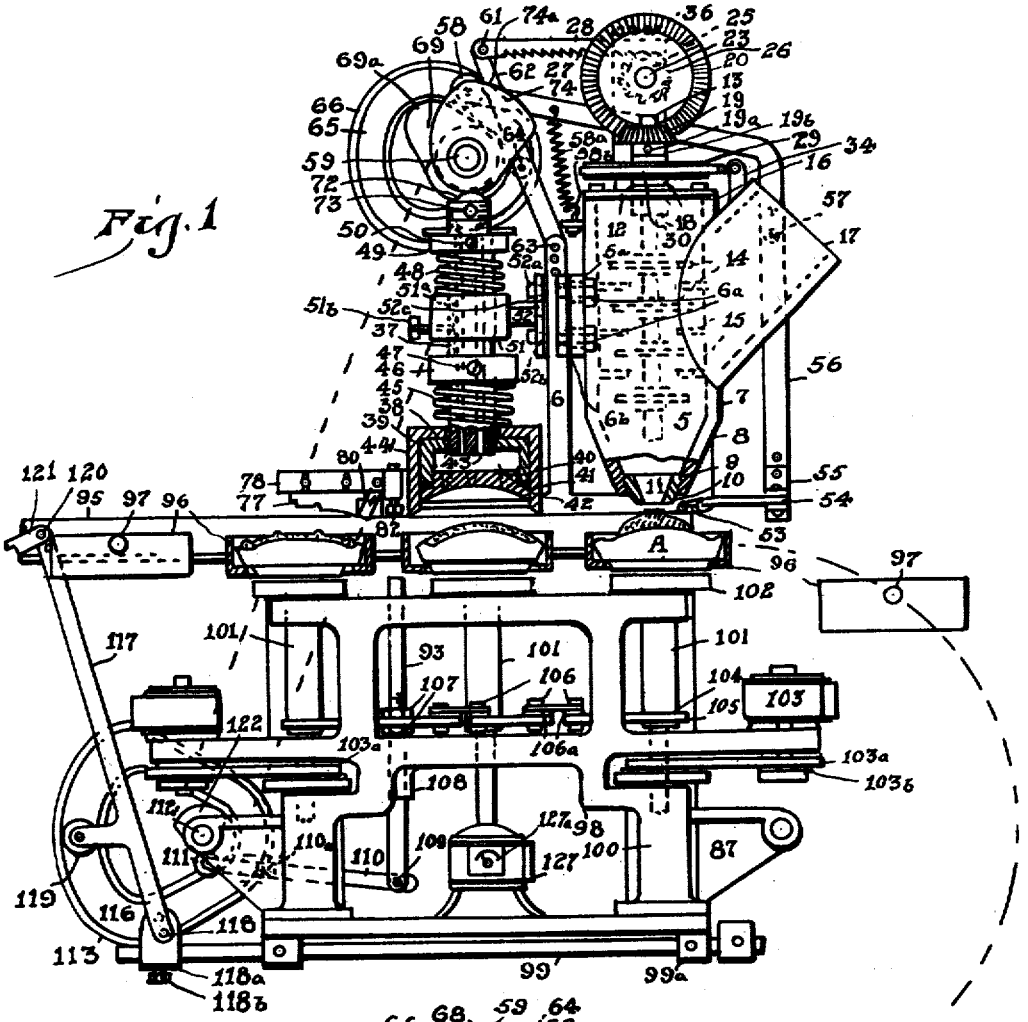
Fig. 1 is a side elevation, partly in section, of a preferred form of mechanism for carrying out my improved method.

In conjunction with this method of fabricating potteryware is a system of ware production embracing the general fabricating steps enumerated together with the automatic conveyance of molds to and from the fabrication zone and the fabrication of ware thereon in the order of presentation. The ware manufactured is known in the art as "jiggered dinnerware" as distinguished from the coarser clayware arts and the clay is refined, plastic, normally adhesive and is applied to and the ware fabricated on absorbent molds to which the clay is bonded and adhesively "stuck" by the die so thoroughly that the danger of clay slippage on the mold whilst rotating as a unit under the profile is avoided, the bond being so thorough that the perfect state of capillarity established is maintained during the removal of excess material and thereafter during drying.

The numeral 5 designates a container, preferably of cylindrical form, which may be formed with a flanged bracket 5a at one side thereof for adjustable securement to a part of the frame, generally indicated at 6, as by screws 6a and shims 6b.

The container 5 has side walls 7, which are preferably straight the greater portion of their vertical extent and then incline inwardly or converge, as at 8, the lower extremity of the container being truncated and open, this opening having inner screw-threads 9 for removable and adjustable insertion of various sized and shaped orifice members, as at 10, having an opening 11. The top of the container may be closed by a lid or cover 12, suitably bolted or otherwise secured to said container, and extending downwardly through the lid or cover 12 is a shaft 13, having inclined feed blades 14 suitably secured thereto and co-operating with reversely inclined ribs or flanges 15, formed integral with or suitably attached to the inner side of the walls 7 of the container 5. To provide for vertical adjustment of the shaft 13 with its feed blades 14 it is preferred to employ annular shim washers or rings between the top or cover 12 and upper end of the container 5, as at 16. A chute 17 opens into the upper side of the container 5, through which the mixed plastic material may be conveyed to said container. The shaft 13 is provided with suitable adjustable thrust or bearing collars 18 above and below the lid or cover 12. The upper extremity or end of the shaft 13 is provided with a bevel gear 19, secured to said shaft 13 as by the screw 19a and the hub 19b this gear 19 meshing with a bevel gear 20, adjustably secured as by the hub 21 and screw 22 on a shaft 23. This shaft 23 preferably extends horizontally across the upper extremity of the mechanism and will be of such length as to accommodate any desired number of units or feeders and is preferably mounted to rotate in suitable bearings at each side of the stationary frame of the mechanism, as at 24, Fig. 2. At its one end or extremity the shaft 23 preferably has a gear 25 splined or otherwise suitably secured thereon, having inclined teeth 26, which mesh with reversely inclined teeth 27, formed on the lower surface of a ratchet bar 28, to impart a feeding actuation to the feed blades 14 on the shaft 13 in the container 5 of each unit controlled by the said shaft 23.

It is usually desirable to impart a slight reverse movement or reciprocation to the feed blades 14 of each container 5 at approximately the limit of each feeding stroke, and to this end I prefer to provide a disk 29 on the upper extremity of each shaft 13 between the bevel gear 19 and top or cover 12. The outer periphery of this disk 29 is preferably formed with a flat groove, and in this groove I prefer to provide a band 30, which may be of asbestos or similar to the ordinary brake band, this band 30 encircling the disk and having the opposite extremities adjustably clamped, as at 31, a threaded bolt 32 being provided having a tension spring 33 loosely applied thereover and abutting at one extremity against the inner shoulder provided by a bracket 34, which is preferably attached to a part of the frame of the machine, and at its opposite extremity abutting against the one extremity of the band 30. To control the degree of friction of the band 30 on the disk 29, a nutted bolt 35a may be passed through the clamped extremities of the band 30 and readily adjusted, and to vary the tension of the spring 33 and consequently the degree of retraction, an adjusting nut 35 may be applied on the one extremity of the bolt 32. The band 30 may be adjusted so that when a feeding stroke is imparted to the ratchet bar 23 and through the connections heretofore explained impart a feeding rotation to the blades 14, the said band will compress the spring, and when the ratchet bar completes its driving or feeding stroke and the reversely inclined teeth 26 and 27 unmesh, the spring 33 will be released and returned to normal position, and as the disk 29 and shaft 13 will at this time move more or less freely, the band will move with the spring back to normal position and reverse the movement of the disk 29 to this extent, and accordingly reverse the movement of the shaft 13 and feed blades 14, to thereby retract or raise the plastic material in the container 5 and from the orifice opening 11. The ratchet bar 28 may be suitably secured to a part of the frame of the mechanism.

Mounted in transverse alignment relatively to the extruding mechanism are means for shaping or preshaping the plastic charge by pressing the same against the mold which firmly secures the charge thereto whilst spreading the charge from its central position radially over the total ware forming surface of the mold, the mold and die forming a molding chamber when in cooperation, substantially closed by ring 44 as hereinafter described and conforms the charge to the shape of the mold and under a pressure that is substantially equally distributed over the clay, preferably comprising in the present instance a cylindrical plunger 37 having screw-threads 38 formed on its lower extremity, for removable and adjustable application of an annular press head or member 39, as shown in section in Fig. 1, also having lower inner screw threads 40, for removable and adjustable application of an annular press plate 41, having a suitably shaped lower surface or face, a chamber being formed above this press plate, as at 42. This chamber may have introduced therein and circulated therethrough various mediums such as hot or cold air, water, oil or other fluid or heating, cooling or lubricating mediums, and likewise, the press plate 41 may be formed of any suitable material and manner, as for instance, porous or have openings therein, so that the fluid or other medium may saturate or exude onto the plastic charge. To enable introduction and circulation of such medium as may be desired, I prefer to form the plunger with longitudinal bores 43, leading into said chamber, and suitable flexible conveying members may be connected with these bores at the upper extremity of the plunger. One advantage of the chamber 42 is that by introduction of a suitable fluid or lubricating medium, the charge will more easily separate from the press plate or will not adhere thereto when the latter is raised, thus insuring retention of the clay on the mold and preventing any tendency toward rupture of the firm bond established. It may also be desirable, in some instances, to inject into the chamber 42 a fluid or mixture which will enhance the finish of the article of pottery or even a coloring fluid, the many advantages appertaining to this chamber being obvious to those skilled in the art.

Slidably mounted and rotatable on the lower extremity of the plunger 37 over the press head 39 and plate 41 is a charge-confining member in the form of an annular ring or sleeve 44 of suitable shape, preferably of the form shown in section in Fig. 1, a spring 45 being loosely mounted on the plunger 37 above said sleeve and adjustably retained in position by means of a collar 46 and set screw 47. To retract or raise the press head and its assembly, a spring 48 may be loosely mounted on the upper portion of the plunger 37 and adjustably retained in position by a collar 49 and set screw 50. The plunger 37 is slidably mounted in and supported by a sleeve 51, bolted or otherwise adjustably secured to the frame 6, as by means of screws 52a passing through enlarged or slotted openings 52b in a flange 52 and threaded into the frame 6. Shims 52c may be provided so that the press or preforming assembly is adjustable in all directions.

It will be seen from the foregoing description of the preforming assembly that in operation the annular press sleeve or ring 44 will first encounter the rim or outer edge of the mold and prevent the clay or plastic charge from being pressed out over the side of the mold, the spring 45 being adjustable on the plunger to regulate the pressure necessary for the press ring 44 to properly perform its function. The press head 39 and plate 41 continue to descend, spreading the clay radially from its central position toward the brim of the mold, and preform the charge, securely bonding the clay to the mold by pressure, or may place it in final form, and then elevates followed by the press ring, and the charge is then ready for the profile and trimmer or jiggering operation, or it may then be considered in final form. Fig. 1 discloses a means for charging molds with plastic clay, the clay being applied to the central zone of the mold, as shown, in an amount sufficient to form a piece of ware. It is obvious that the structure of this preforming assembly could be varied without departing from the scope of the invention, the construction illustrated being simply a preferred means for accomplishing the desired operation.

The means for severing or segregating each charge of plastic material as it is extruded onto the mold may be in the form of a wire or blade 53, mounted in a bracket 54, as in the present instance, or may be a number of wires or in the form of a grid. I prefer to adjustably mount the bracket 54, as at 55, on one extremity of a bell crank lever 56, adjustably fulcrumed as at 57 on one side of the chute 17, a cam roller 58 being rotatably mounted on the opposite extremity thereof for a purpose which will be hereinafter explained.

Figure 2:
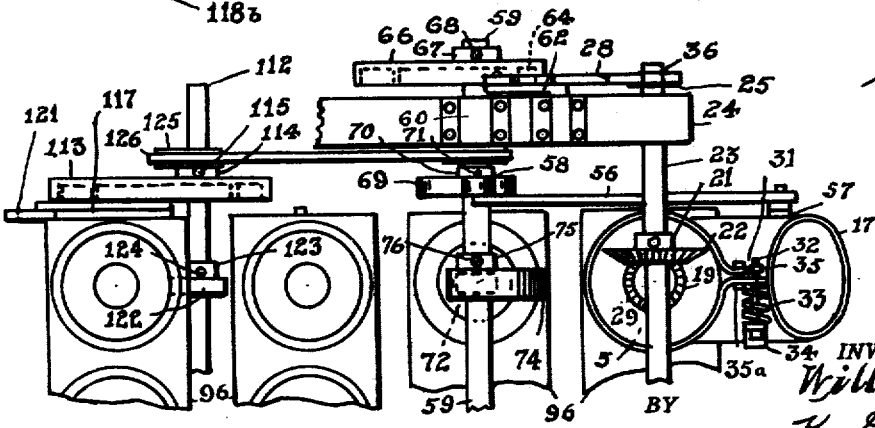
Fig. 2 is a top plan view of a part of the mechanism.

Various means could be adopted to operate the several instrumentalities heretofore described, or the extruding, severing or segregating and preforming means, in timed relation, but I prefer to employ cam devices arranged on a common drive shaft 59, Fig. 2, rotatably mounted in bearings on opposite sides of the frame of the mechanism as at 60, and which will be of such extent as to accommodate the number of units in operation. Adjustably pivoted to one extremity of the ratchet bar 28, as at 61, is a lever or bar 62, extending down and in turn adjustably pivoted as at 63 to a part of the frame 6. Rotatably mounted on the bar 62 at an intermediate point is a cam roller 64 moving in a cam track 65 formed in a cam wheel 66, adjustably mounted on the shaft 59 as by a hub 67 and screw 68. The shape and throw of this cam 66 is such that at each rotation thereof a proper feeding stroke will be imparted to the ratchet bar 28, to in turn impart a feeding rotation or movement to the feed blades 14 on the shaft 13 and extrude a charge of plastic material, the size of which may be varied by varying the length of the stroke of the ratchet bar 28 through the adjustable pivot connections 63.

The cam roller 58 rides on and is maintained in continual engagement with a cam 69, also adjustably mounted on the shaft 59 as by a hub 70 and screw 71, by a coil spring 58a, adjustably secured at one extremity by a threaded hook bolt as at 58b and attached at its opposite extremity to the bell crank lever 56. This cam 69 is of proper contour and has a high part or raise 69a which imparts the severing movement to the member 53 mounted in the bracket or yoke 54 at the lower extremity of the bell crank lever 56 in timed relation to the extruding means controlled by the adjustable cam 66.

To operate the preforming assembly, I prefer to bifurcate the upper extremity of the plunger 37 and mount therein a cam roller 72 on a bearing pin 73, extending through the upper bifurcated extremity of said plunger. This cam roller 72, through the action of the spring 48, continually engages a cam 74, also adjustably mounted on the shaft 59 as by a hub 75 and screw 76. The cam 74 is formed of suitable shape and size and has a high part 74a. When the high part 74a engages the roller 72, the press head 39, press ring 44 and press plate 41 will be in their lowermost position on the mold containing the charge of plastic material, to preform the latter. The rising movement of this assembly may be more gradual, the press head 39 and plate 41 first leaving the charge and then the press ring 44. To prevent rotation of the plunger, I prefer to form a longitudinal groove 51a, therein and insert a screw 51b through the sleeve 51 into said groove.

It may be desirable in some instances to form the lower surface of the press plate 41 with grooves or irregularities, particularly in the event the mold is being rotated when the charge is being preformed.

To perform the final or jiggering operation, I prefer to use a profile and trimmer assembly of the form illustrated in my Patent No. 1,757,132, but this structure may be varied as required and found necessary to adapt it to the article of pottery being manufactured. This profile and trimmer assembly may be readily understood by referring to my above application, and a general description thereof should suffice. The assembly generally comprises a profile 77, adjustably mounted on a support 78, the support and profile being slidable vertically in guides attached to a bracket, which may be adjustably secured to a part of the frame. The support is limited in its downward movement by a stop plate and moves upwardly against the tension of a spring. A trimmer 80 is adjustably mounted on a suitable holder, not shown, to co-operate with the profile 77. The profile support has an adjustable screw bolt 82 inserted in the lower portion thereof, which is adapted to intermittently contact with a pitman 93, to raise and lower the profile in timed relation to mechanism for shifting the molds, to be described.

As hereinbefore stated, any suitable conveyor could be utilized for carrying the molds, or they could be disposed in position under and removed from the improved feeder mechanism manually. However, in the present instance I prefer to use an endless conveyor as shown in my co-pending application hereinbefore noted and, generally speaking, comprising a track 95 over which the trays 96 move. These trays are usually connected by links in series and have openings therein for placement of the molds. Each tray swings free on a projecting trunnion 97, which may slide or have bearing on the track, and thus the trays are always maintained in a horizontal position regardless of the direction in which the chain has movement.

For the jiggering operation it is desirable to rotate the molds and also raise and lower the same, but during the extruding and severing and preforming operations, it may or may not be desired to rotate and raise and lower the same, but during the extruding and severing and preforming operations, it may or may not be desired to rotate and not raise and lower the molds, and vice versa.

In the present instance I provide a frame, generally indicated at 98, which is slidably or adjustably mounted on supporting rails or members 99, as at 99a, the frame 98 having pivot bearings 100, which rotatably receive spindles 101, the latter terminating in chucks 102, adapted to support or carry the mold while the latter is in position under the container 5, preforming assembly and jigger assembly. In the present instance an independent motive means, as at 103, is provided for rotating the spindles 101 and chucks 102, but these spindles could be rotated uniformly or separately by cams or otherwise if desired. Each spindle has a reduced portion or neck 104, which fits into a cross fork 105. A separate cross fork may be provided for each spindle and adjustably connected by nutted bolts 106 and shims 106a, so that the spindles and chucks may be disposed at varying elevations. The spindles are shown connected by the cross forks in the present instance, but it may be preferred to disconnect the cross forks and control the raising and lowering of each chuck and spindle by separate cams and levers as shown for example in Fig. 3. However, in this instance I show the cross forks adjustably connected and controlled as to vertical movement by the pitman rod 93, which extends through one of the cross forks and is provided with supporting and adjusting nuts above and below the same, as at 107. The pitman 93 extends downwardly through a sleeve 108 and is pivoted as at 109 to one extremity of a lever or bar 110, preferably disposed substantially horizontally and having a cam roller 111 rotatably mounted at its opposite extremity, said lever 110 being adjustably fulcrumed as at 110a. The foregoing structure may be readily understood by referring to my Patent No. 1,757,132.

A main drive shaft 112, extending to a suitable source of power, not shown, is provided in the present instance, and may have bearing at opposite sides of the frame of the mechanism. This shaft will obviously be of such length as to accommodate the number of units in service, and in the present instance carries the cams for moving the trays and for raising and lowering the spindles and chucks bearing the molds. For moving the trays it is preferred to use a cam 113 at each side of the track, adjustably mounted on the shaft 112 as by hub 114 and screw 115. Each cam is preferably formed with a track 116. A lever or bar 117 is adjustably pivoted at its lower extremity as at 118 to an adjustable bracket 118a secured by screws 118b to the rail 99 and has a cam roller 119 rotatably mounted thereon and moving in the track 116. The upper extremity of the lever 117 has mounted therein a bearing pin or small trunnion 120, and mounted on this trunnion is an adjustable pawl 121, which rides over the tray trunnions 97 on the backward movement of the lever 117 and drops by gravity a sufficient distance to abut against the projecting trunnion, and when the lever is moved forwardly due to the cam roller moving in the cam track 116, the conveyor will be moved the distance required in accordance with proper adjustments.

A cam 122 is provided in the present instance to operate the pitman 93, this cam being adjustably mounted on the shaft 112 as by a hub 123 and screw 124. This cam may be of any suitable shape and the roller 111 on the lever 110, which is adjustably fulcrumed as at 110a, continually engages said cam, to thereby actuate the pitman 93 when the cam is rotated. As hereinbefore noted, separate levers and cams may be provided for each spindle if desired and properly synchronized.

Power may be transmitted from the shaft 112 to the shaft 59 by means of pulleys or sheaves 125 and flexible members or belts 126, and likewise, a flexible member or belt 103a may be provided for the motor 103 and adjustably connected by means of a cone pulley 103b. The motor 127 may be provided with any appropriate rheostat or speed regulating means as at 127a. The shaft 112 may rotatably extend through and have bearing in a supporting bracket 87, which may be formed integral with or be attached to the frame 98. A bracket is shown at both ends of the chuck and spindle mechanism or frame so that the shaft and cam mechanism may be mounted at either end as found convenient or desirable.

During the extruding operation as well as the preforming operation the molds may or may not be rotated. One advantage of rotating the mold during the extruding of the plastic charge thereon is that the charge is more easily segregated or severed, as the neck will be twisted while the knife is passing therethrough. This whirling or rotating of the mold will also assist in more evenly distributing the charge on or in the mold and to some extent preform the charge. Also it may or may not be desirable to raise and lower the mold during the extruding operation, or the mold may be raised and at the same time rotated and the plastic material in the container 5 and orifice opening 11 retracted and the mold lowered, in which event the charge may be segregated with very little or no assistance on the part of the shear or knife 53.

In some instances it may be desirable to rotate the mold during the preforming operation, but ordinarily during this phase of the cycle of operations the chuck may be adjusted so as to raise sufficiently to afford a firm support for the mold while the press head, plate and press ring descend, and the motor 103 may be disconnected from the spindle or need not be operated. In case the mold is rotated, it may be desirable to rotate the press ring also, to prevent wearing away of the outer edge of the mold and the press ring is adapted to be mounted so as to rotate with the mold if desired.

During the jiggering operation it will ordinarily be desirable to rotate the mold, and also raise and lower the same, the headed contact bolt 82 being adjustable so that the pitman 93 will contact therewith at the time the mold reaches a vertical point where the profile and trimmer most advantageously perform their functions, and both the profile and trimmer are also adjustable relatively to the mold.

Figure 3:
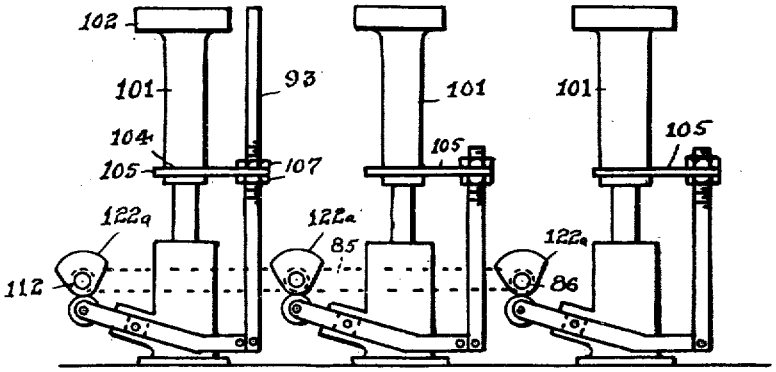
Fig. 3 is a diagrammatic view in side elevation, showing one manner of individually raising and lowering the spindles and chucks.

As hereinbefore specified, it may be desirable to control the raising and lowering of the molds independently, and Fig. 3 illustrates one manner of accomplishing this result. In this instance a belt or other flexible member 85 may connect the shafts 86 on which the cams 122a are adjustably mounted as in Fig. 2. By this means the chucks and spindles may be raised and lowered independently or as a unit by simply connecting and disconnecting the flexible member 85 relatively to the cam shafts desired to be operated or remain idle.

From the foregoing the operation should be apparent, and a general outline should be sufficient. Power may be applied primarily to drive shaft 112 and thence to the upper shaft 59 through the flexible transmission member 126. The cam roller 64 moving in the cam track 65 will first impart a feeding stroke to the ratchet bar 28 to thereby impart a feeding rotation to the feed blades 14 and extrude a charge of plastic material into or on the mold A. The retraction disk 29 with its band 30 and spring 33 may or may not be adjusted to operate, as desired, the degree of retraction of the plastic material being readily governed by adjusting the thumb nut 35. The severing mechanism may be adjusted to operate at the time it will most advantageously preform its function. When the charge is extruded onto or in the mold A, it will bulge or spread and be caused to adhere to the mold and to some extent be preformed. The mold may be raised and rotated or the chuck adjusted to raise just sufficiently to afford a firm support for the mold and the latter not rotated, as fully explained heretofore. The cam 113 on the shaft 112 may be so adjusted that the conveyor will be moved a step forward and dispose the mold with the segregated charge thereon under the press head and assembly at the proper time, and the annular press ring 44 will descend and first contact with the rim of the mold and prevent the charge from being pressed beyond the edge of the mold, and the press head 39 and plate 41 will then descend and preform or press the charge in or on the mold. Some of the advantages of the chamber 42 have been heretofore explained, and this chamber will of course descend and function at this time with the press head 39 and plate 41. As has also been heretofore explained, the chuck and spindle may be raised and lowered or rotated as desired, during this preforming operation. The press assembly then rises and the mold with its charge may then be considered as finished or ready for the profile and trimmer or jiggering operation, and another step-by-step movement may be imparted to the conveyor. The mold with its charge is then preferably raised the proper height, according to adjustment, and rotated and subjected to the jiggering operation.

Figure 4:
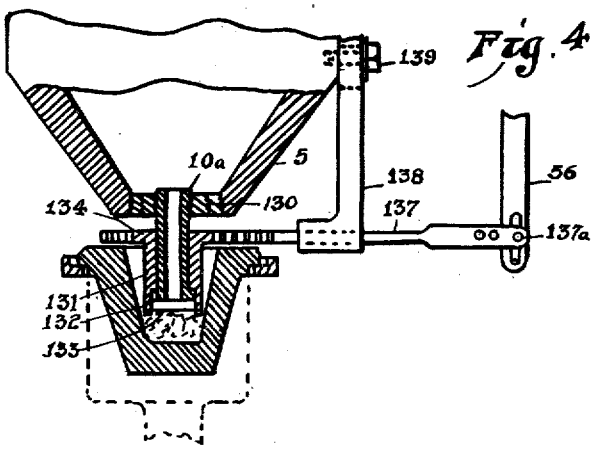
Fig. 4 is a sectional view of one preferred form of orifice member and severing or segregating means which may be used to adapt the extruding means to deep molds.
Figure 6:
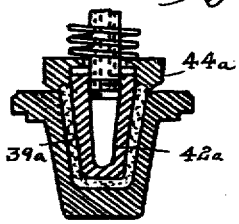
Fig. 6 is a transverse vertical sectional view of a press or preforming assembly which may be used for deep molds.
Figure 5:
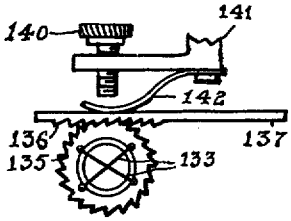
Fig. 5 is a horizontal sectional plan of the segregating means embodied in Fig. 4.

Figs. 4, 5, and 6 show a modification in structure which I prefer to employ in the use of molds such, for instance, as are used in the manufacture of bowls, cups, etc. The orifice member 10a in this instance is preferably adjustably threaded into a bushing 130, also adjustably threaded into the lower open end of the container. A sleeve 131 may be rotatably mounted over the orifice member prior to its insertion in the bushing 130 and rotatably supported by a flange 132, formed on the lower extremity of the said member, which fits in an annular shoulder formed in the lower extremity of the sleeve. Across the lower projecting end of the sleeve I prefer to secure the cutting members 133. It may be desirable to employ only one of these cutting members or any number may be used. The upper extremity of the sleeve 131 may be formed as a gear 134 having inclined teeth 135, which mesh with reversely inclined teeth 136, formed on a ratchet bar 137 adjustably pivoted as at 137a to the bell crank lever 56, and maintained horizontal and slidable in a support 138, which may be adjustably secured to the container as at 139. These cutting members may be rotated intermittently in one direction or it may be desirable to impart a reciprocating movement at the sleeve 131 and cutting members 133.

To illustrate a structure which may accommodate either an intermittent cutting movement in one direction or reciprocatory movement of the cutting members, I provide an adjusting screw 140, threaded through a support 141, which may be attached to or form a part of the frame of the machine, this screw 140 being adjustable to bear against a spring 142, suitably secured to the support 141, as at 143, and the spring in turn bearing against the ratchet 137. By screwing the adjusting screw 140 inwardly against the ratchet 137, the reversely inclined teeth 135 and 136 may be prevented from unmeshing and thus impart a reciprocatory movement to the sleeve 131. If it is desired to rotate the sleeve intermittently in one direction, the adjusting screw 140 may be retracted sufficiently to clear the spring 142, and the latter will then exert a yielding pressure against the ratchet 137, which will retain the inclined teeth 135 and 136 in mesh during the forward stroke in the present instance and allow said teeth to unmesh during the reverse movement of said ratchet.

To accommodate the press or preforming means to this type of mold, a press ring as at 44a, Fig. 6, may be used and a press head as at 39a having a chamber 42a, which will serve for the introduction and circulation of fluid or other mediums as described in connection with the chamber 42. The side and bottom walls of the press head may be made porous or otherwise as specified in connection with the press plate 41. The jiggering assembly may be of any suitable type adapted for molds of this form, but I prefer to use a profile and trimmer assembly as disclosed in my co-pending application Serial No. 155,233, filed December 16, 1926.

Figure 7:
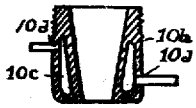
Fig. 7 is a section through a modified form of orifice member.

It may be desired in some instances to introduce and circulate various fluids or other mediums in the orifice member 10 or 10a, and in Fig. 7 the orifice member 10b is shown as provided with a chamber 10c into which the desired medium may be introduced through the ports 10d. By this means the orifice member may be heated or cooled, or the walls thereof may be made porous or be perforated and a lubricating fluid or other fluid introduced into the chamber 10c and exude through said walls onto the plastic material as it is extruded from the container.

A brief summary of the preferred operation of the machine may be stated as follows: A measured charge is forced through the orifice member in the form of a column, which is intercepted by the mold, or the column is extruded forcefully against the mold and spreads or expands thereon or therein, the mold preferably being rotating at this time to auxiliate this spreading action, and the clay thus initially conforms to the contour of the mold and is caused to adhere to the mold, the column then being severed above the plane of expansion to segregate the charge, and at the same time the mold may be lowered and the stub of the column retracted from the cutter and from the severed charge, to facilitate shifting of the mold and prevent readhesion of the severed surfaces and to clean the cutter on its return stroke. The mold is then shifted under the press head and the press then operates to press the charge, engaging the exposed surface thereof and spreading the clay, to the desired shape and conforming its lower or mold-contacting surface to the mold contour whilst adhesively bonding it thereto, the charge confining member or ring limiting the radial expansion of the charge. The mold with the formed charge thereon may then be advanced and rotated in operative adjacency to the profile and trimmer to put the finishing touches to the ware and enhance its finish.

When there are a number of the improved feeders in use and it is desired to feed or extrude varying sizes of charges from each feeder, the gears 19 and 20 or either of them may be removed and gears of the proper ratio substituted therefor, or, the inclination of the blades 14 may be altered on the shaft 13 or different blades substituted therefor, or, the size or shape of the orifice at the bottom of the container may be varied or said orifice may be adjusted in a vertical direction. Any suitable adjustments may be made to adapt the improved feeders to varying sizes of charges and each feeder could, if desired, have an independent cam and ratchet bar and gears used in connection therewith.

What I claim is:

1. In mechanism of the class specified, means for automatically extruding plastic material forcefully against the forming surface of a mold, and means for rotating the mold.

2. In mechanism of the class specified, means for extruding a charge of plastic material directly onto a mold, segregating means, a press member adapted to co-operate with the mold to form the charge and means for raising, lowering and rotating the mold.

3. In mechanism of the class specified, means for extruding plastic material directly onto a mold, means for retracting the material, means for segregating the material in charges, and means for moving the mold in a vertical plane in timed relation to the retracting means.

4. In mechanism of the class specified, means for automatically progressing plastic material onto a mold, means for segregating the material in charges, means for retracting the material to assist in the segregating operation, and means for pressing the charge against the mold to conform the charge to the contour of the mold.

5. In mechanism of the class specified, means for extruding charges of plastic material onto a mold, means for segregating the charge, and means for retracting the material and reciprocating the mold.

6. In mechanism of the class specified, means for extruding charges of plastic material forcefully against the forming surface of a mold, means for segregating the charges, and means for rotating the mold to preliminarily preform the charges.

7. In mechanism of the class specified, means for automatically extruding plastic material forcefully against the forming surface of a mold, means for segregating the material in charges, and means for preforming and conforming the charges to the shape of the mold and jiggering the charges while on the mold.

8. In mechanism of the class specified, means for automatically extruding plastic material directly against the forming surface of a mold, means including a press member adapted to co-operate with the mold, and independent means for vertically moving the mold.

9. In mechanism of the class specified, means for automatically extruding a charge of plastic material directly against the forming surface of a mold and preliminarily preforming the charge, means for preforming and final forming the charge, means for simultaneously moving the mold and/or the preforming means relatively to one another, and means co-operating with the mold to limit the spreading action of the material relatively to the mold.

10. In mechanism of the class specified, means for automatically extruding a charge of plastic material onto a mold, means for simultaneously vertically moving and rotating the mold to preliminarily preform the charge, and means for final forming the charge including a press member and charge-confining member adapted to co-operate with the mold to conform the charge to the contour of the mold and confine the material to the forming surface area of the mold.

11. In mechanism of the class specified, means for automatically extruding a charge of plastic material against the forming surface of a mold, preforming means, and means co-operating with the preforming means to convey a fluid medium to the surface of the charge.

12. In mechanism of the class specified, means for automatically depositing a charge of plastic material onto a mold, means for molding the charge having a chambered body, and means for conveying a fluid or gaseous medium to the chamber and exuding said medium onto the surface of the preformed charge through said body.

13. In a machine for the manufacture of articles of pottery, the combination with a mold conveyor, of a container for plastic material, means for extruding a predetermined charge of plastic material forcefully against the forming surface of a mold and preliminarily preforming the charge, segregating means, means for pressing the charge against the mold to preshape the charge, jiggering means, and means for imparting a step-by-step movement to the conveyor.

14. In a machine for the manufacture of pottery, the combination with a mold carrier, of a container for plastic material, means for extruding the plastic material forcefully against the forming surface of a mold, means for segregating the material in charges and preliminarily preforming the charges, means for conforming the charges to the shape of the mold, jiggering means, means for vertically moving and rotating the molds, and means for imparting a step-by-step movement to the mold carrier.

15. In a machine for the manufacture of pottery, the combination with a mold conveyor, of a support for plastic material, means associated with said support for advancing the material a predetermined distance, severing means for segregating material into charges, press means for conforming the charge to the shape of the mold and bonding the charge thereto, means for releasing the press member from the clay, means for jiggering the charge, means for vertically moving and rotating the molds, and means for imparting a step-by-step movement to the conveyor.

16. The combination according to claim 15 wherein the means for vertically moving and rotating the molds may be operated and adjusted independently.

17. The combination according to claim 15, wherein the means for imparting a step-by-step movement to the conveyor is adjustable to operate in timed relation with the segregating, preforming and jiggering means.

18. The combination according to claim 15, wherein the means for vertically moving and rotating the molds and the means for imparting a step-by-step movement to the conveyor may be adjusted as a unit laterally relatively to the support and preforming means.

19. The method of feeding plastic material to molds in the manufacture of pottery, which consists in progressing the material in a container through a restricted outlet opening forcefully against the forming surface of a mold, and distributing the material over the said surface through centrifugal action.

20. The method of feeding plastic material to molds in the manufacture of pottery, which consists in progressing the material through a restricted outlet against the forming surface of a mold, the material assuming the shape of a column when passing through said outlet, segregating the material in charges, and retracting the column to assist in the segregating operation.

21. The method of feeding plastic material to molds in the manufacture of pottery, which consists in extruding the material forcefully against the forming surface of a mold in the form of a column, intercepting the issuing column by the mold and rotating the latter to distribute the material thereover and segregate the material from the column, pressing the charge against the mold to conform the charge to the contour of the mold and completely confining the charge to prevent radial expansion thereof beyond a predetermined area of the mold surface, and rotating the mold with the conformed charge thereon in operative adjacency to profiling tools to enhance the finish of the charge.

22. The method of fabricating dinnerware which comprises applying a body of clay to a mold, engaging the clay with a die having a surface co-extensive with that of the molding surface, spreading the clay over the molding surface and adhesively bonding it thereto, releasing the die with a fluid means to insure retention of the clay on the mold and thereafter finishing the exposed surface of the clay.

23. Apparatus for the manufacture of dinnerware comprising, in combination, means for applying clay charges of definite predetermined volume to molds, a pressing die having a face circumferentially co-extensive with the forming surface of a mold, said die or said mold being movable relative to one another to spread the charge of clay over the forming surface of the mold and simultaneously bond the clay thereto, fluid means for separating the clay from the face of the pressing die and means for jiggering the clay.

24. The method of feeding plastic material to molds in the manufacture of dinnerware which comprises, moving a mass of the material downwardly into adjacency to a forming surface, segregating material from the mass which is deposited on the forming surface and supporting the end of the mass relative to the segregated material.

25. In the feeding of plastic material to molds in the manufacture of dinnerware, the method which consists in advancing a column of clay into engagement with the forming surface of the mold, severing a portion of the clay to form a charge retained by the mold and retracting the clay stub and/or mold or both to separate the material.

26. A machine for making dinnerware on absorbent molds from plastic clay having a mold supporting means, a press member, means for repelling the press member from the clay to prevent impairment of the bond between the clay and mold upon withdrawal of the press member, and a jiggering means.

27. Apparatus for the manufacture of jiggered potteryware in or on jiggering molds which comprises, in combination, a clay feeding mechanism, press means, jiggering means, mechanism for moving molds from said feeding mechanism to said press means and said jiggering means, said press means comprising a die having a pressing surface complemental to the ware forming surface of the mold, means for co-operating said die with said molds and means for repelling the die from the clay.

28. Apparatus for manufacturing jiggered potteryware in or on jiggering molds which comprises, in combination, clay feeding mechanism arranged to segregate and charge molds with clay bodies from which the ware is to be manufactured, press means arranged to co-operate with the molds to spread the clay charges on the surface of the ware forming portion of the molds, fluid means for repelling the press means from the clay, jiggering means, means located adjacent said feeding mechanism, said press means and said jiggering means for supporting said molds and means for progressing molds from one support to another.

29. Apparatus for manufacturing jiggered potteryware in or on jiggering molds which comprises, in combination, clay feeding mechanism, means for spreading clay on and bonding it to said molds, and a jiggering means, said means for spreading clay on and bonding clay to molds comprising a press member having a surface complemental to the said molds adapted to form when in co-operation therewith, a molding chamber in which the clay is spread over the ware forming surface of the mold and extended to full ware diameter and means for repelling the clay from the press member.

30. The method of fabricating jiggered potteryware which comprises, forming a clay charge, applying the charge to a mold, pressing the charge between the mold and a stationary matrix to flow the clay over the ware forming surface of the mold and extend the clay to full ware diameter, repelling the clay from the matrix, jiggering the clay and thereafter drying the same.

31. The method of fabricating jiggered poteryware which comprises, charging a portion of the molding surface of a mold with a body of clay and then pressing the clay between the mold and a matrix to flow the clay in all directions simultaneously over the exposed portion of the ware forming surface of the mold, repelling the clay from the matrix, profiling the clay and thereafter drying the clay.

32. The method of fabricating jiggered potteryware which comprises, segregating a clay charge having a predetermined volume of clay therein and depositing said charge centrally of the ware forming surface of a mold leaving the brim zone of the ware forming surface of the mold exposed and then squeezing the charge of clay between the mold and a matrix to expand the charge and cause it to flow over the exposed portion of the mold and be extended to full ware diameter, repelling the clay from the matrix and thereafter profiling the clay to remove excess material and reduce the article of ware to the proper cross section thickness and then drying the ware.

WILLIAM J. MILLER.

CERTIFICATE OF CORRECTION.

Reissue No. 20,401. June 8, 1937

WILLIAM J. MILLER.

It is hereby certified that error appears in the printed specification of the above numbered patent requiring correction as follows: Page 1 first column, line 29, for the word "recent" read present; line 31, for "elastic" read plastic; page 7, second column, line 16, after claim 25, insert the following as claim 26:

> 26. The combination according to claim 15 wherein the means for conforming the charge to the shape of the mold includes a member adapted to limit the radial expansion of the charge.;

and for the claims now appearing in the patent as numbers 26, 27, 28, 29, 30, 31 and 32 read 27, 28, 29, 30, 31, 32, and 33 respectively; and that the said Letters Patent should be read with these corrections therein that the same may conform to the record of the case in the Patent Office.

Signed and sealed this 10th day of August, A. D. 1937.

Leslie Frazer
Acting Commissioner of Patents.

(Seal)